United States Patent
Souder et al.

[11] Patent Number: 5,867,102
[45] Date of Patent: Feb. 2, 1999

[54] ELECTRONIC ARTICLE SURVEILLANCE LABEL ASSEMBLY AND METHOD OF MANUFACTURE

[75] Inventors: Edward D. Souder, Downers Grove; Janusz Szczepaniec, Willow Spring; Ronald R. Garrison, Batavia, all of Ill.

[73] Assignee: Wallace Computer Services, Inc., Hillside, Ill.

[21] Appl. No.: 807,290

[22] Filed: Feb. 27, 1997

[51] Int. Cl.$^6$ .................................................. G08B 13/14
[52] U.S. Cl. ............................................. 340/572; 283/83
[58] Field of Search .................................. 340/572, 551; 283/83; 156/230, 250, 303

[56] References Cited

U.S. PATENT DOCUMENTS

| | | | |
|---|---|---|---|
| 4,794,470 | 12/1988 | Lauffenburger et al. | 340/572 |
| 4,900,386 | 2/1990 | Richter-Jorgensen | 340/572 |
| 4,910,499 | 3/1990 | Benge et al. | 340/572 |
| 4,967,185 | 10/1990 | Montean | 340/572 |
| 5,146,204 | 9/1992 | Zhou et al. | 340/572 |
| 5,241,299 | 8/1993 | Appalucci et al. | 340/572 |
| 5,431,763 | 7/1995 | Bradshaw | 156/256 |
| 5,432,499 | 7/1995 | Montean | 340/572 |
| 5,477,219 | 12/1995 | Zarembo et al. | 340/572 |
| 5,493,275 | 2/1996 | Easter | 340/572 |
| 5,495,230 | 2/1996 | Lian | 340/551 |
| 5,499,015 | 3/1996 | Winkler et al. | 340/551 |
| 5,602,528 | 2/1997 | Witchger | 340/572 |
| 5,605,768 | 2/1997 | Furukawa et al. | 340/572 |
| 5,654,693 | 8/1997 | Cocita | 340/572 |
| 5,699,047 | 12/1997 | Tsai et al. | 340/572 |
| 5,714,935 | 2/1998 | Ryan, Jr. | 340/572 |

*Primary Examiner*—Jeffery A. Hofsass
*Assistant Examiner*—Sihong Huang
*Attorney, Agent, or Firm*—Roylance, Abrams, Berdo & Goodman, L.L.P.

[57] ABSTRACT

An integrated pressure sensitive adhesive backed label assembly includes a security device such as an electronic article surveillance device, security tag or other antitheft device on a bottom side of the label so that the security device is not readily noticeable to the consumer. The label assembly can have the security device bonded to the adhesive backing of the label by separating the release liner from the label, placing the security device on the label and reapplying the release liner. Alternatively, as portions of the release liner can be cut and removed to expose a small area of the adhesive so that the security device can be attached directly to the label. The small area of the release liner can be cut and the security device attached to the cut portion so that the remaining portion of the release liner can be separated while leaving the cut portion and the security device attached to the label.

29 Claims, 7 Drawing Sheets

ELECTRONIC ARTICLE SURVEILLANCE LABEL ASSEMBLY AND METHOD OF MANUFACTURE

FIELD OF THE INVENTION

The present invention is directed to a label assembly having an electronic article surveillance device attached thereto. More particularly, the present invention is directed to a label assembly and method of producing a label assembly having an electronic article surveillance device positioned beneath the label in an inconspicuous location.

BACKGROUND OF THE INVENTION

It is common practice in many retail stores to provide some form of security to minimize and deter theft of the merchandise. In recent years, electronic article surveillance systems have been used effectively in an effort to prevent or deter theft. One common form of electronic article surveillance system includes a marker or security tag attached directly to the merchandise. The marker can be adhesively attached to the package or attached as a hang tag. The marker is designed to cooperate with an alarm device that produces an electromagnetic or magnetic or radio frequency field positioned at strategic locations, such as at the exits of a store. When the marker enters the magnetic field, the alarm device senses the presence of the marker and actuates an alarm signal. The marker can be deactivated by a cashier using a deactivation device which changes the magnetic characteristics of the marker so that the alarm will not be activated. Alternatively, the marker can be removed from the merchandise. These systems require the store clerk to remember to remove or deactivate the marker to avoid activating the alarm.

The markers are typically of the type which are detected by a magnetic field produced by a security device. The security device detects a signal radiated from the marker. Several types of markers are known which generate a harmonic signal in response to an alternating field. One example of this type of marker is disclosed in U.S. Pat. No. 4,063,229 to Welsh.

Other forms of surveillance markers include a thin strip of magnetic material which produces a high harmonic signal pulse in response to an alternating field. Examples of this type are disclosed in U.S. Pat. Nos. 4,660,025 and 4,980,670 to Humphrey.

Electronic article surveillance systems are an effective deterrent to theft of merchandise in stores. However, the electronic article surveillance device or tag is usually visible and capable of being removed by unauthorized persons. Once the security device is removed, the surveillance system will no longer function to detect the presence of the article. Therefore, it is desirable to place the marker in an inconspicuous location and attach the marker in a manner which is difficult to remove. Some manufacturers attach an electronic article surveillance marker before the goods are shipped to the retail merchant. The security devices can be fixed to the outside of the container or hidden within the container.

While electronic article surveillance devices are an effective deterrent to theft of merchandise, there is a continuing need in the industry for efficient systems for applying the markers onto the merchandise.

SUMMARY OF THE INVENTION

The present invention is directed to a label assembly and to a process of producing a label assembly having an antitheft device such as an electronic article surveillance device integrated in the label. Accordingly, a primary object of the invention is to provide an efficient and effective label assembly and process for producing label assemblies having an electronic article surveillance device or other element attached to the label.

A further object of the invention is to provide a label assembly and a process for manufacturing a label assembly having an electronic article surveillance device adhesively bonded to the bottom surface of a label so that the label and surveillance device can be applied simultaneously to an article with the surveillance device hidden from view.

Another object of the invention is to provide a label assembly and a process for manufacturing a label assembly having an electronic article surveillance device adhesively attached to a label and covered by a release liner attached to the label such that the label can be removed from the release liner with the surveillance device fixed to the label.

Still another object of the invention is to provide a label assembly and a method of manufacturing the label assembly having an electronic article surveillance device attached to a cut portion of a release liner wherein a substantial portion of the release liner is removable from the label without separating the electronic article surveillance device and cut portion of the release liner from the label.

A further object of the invention is to provide a label assembly and a process for producing a label assembly having a label with a bottom surface covered with a pressure sensitive adhesive, a release liner covering a portion of the pressure sensitive adhesive with a sufficient portion of the pressure sensitive adhesive exposed to adhere the label to a substrate, and an electronic article surveillance device attached to the release liner.

Another object of the invention is to provide a process of manufacturing a label assembly by attaching an electronic article surveillance device to a label having a pressure sensitive adhesive and a release liner.

A further object of the invention is to provide a process of manufacturing a label assembly having an electronic article surveillance device from a preprinted label having a pressure sensitive adhesive and a release layer.

The objects of the invention are basically attained by providing a pressure sensitive adhesive label assembly comprising: a label having a top surface and a bottom surface, and a pressure sensitive adhesive coating on the bottom surface, the label having a length and a width; and at least one antitheft device attached to the bottom surface of the label, wherein the antitheft device has a length and a width less than the length and width of the label whereby the label completely covers the antitheft device.

The objects of the invention are further attained by providing an adhesive label assembly comprising: a release liner having a coating of a release layer; a plurality of spaced-apart labels attached to the release liner and having a bottom surface with a substantially continuous coating of a pressure sensitive adhesive; and a plurality of electronic article surveillance devices, each of the devices being attached to the bottom surface of a respective label, wherein each of the labels are separable from the release liner to expose a portion of the pressure sensitive adhesive on the label without separating the electronic article surveillance device from the label.

The objects of the invention are also attained by providing an article and label assembly comprising an article having an outer surface; at least one electronic article surveillance device on the outer surface of the article; and a label having a top surface, a bottom surface, and a pressure sensitive adhesive on the bottom surface, wherein the label is adhesively bonded to the article and covers the electronic article surveillance device.

The objects of the invention are further attained by providing a process for producing a label assembly comprising the steps of providing a label assembly including a label having a top surface and a bottom surface, a pressure sensitive adhesive on the bottom surface, and a release liner removably bonded to the pressure sensitive adhesive; and attaching an electronic article surveillance device to the bottom surface of the label, wherein the electronic article surveillance device has a length and width less than a length and width of the label.

Other objects, advantages and salient features of the invention will become apparent from the following detailed description, which, taken in conjunction with the drawings, discloses preferred embodiments of the invention.

BRIEF DESCRIPTION OF THE DRAWINGS

Referring to the drawings which form part of this original disclosure.

DETAILED DESCRIPTION OF THE INVENTION

Figure 1:
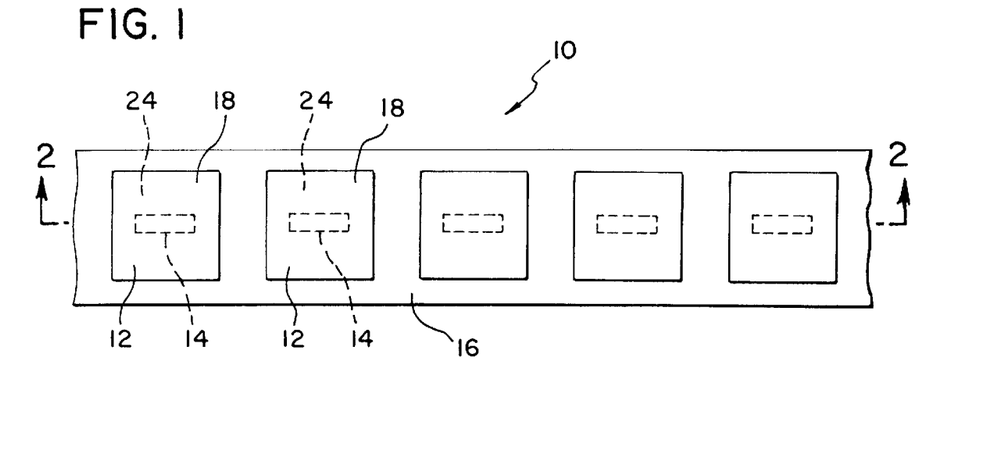
FIG. 1 is a top plan view of a label assembly in a first embodiment of the invention showing a release liner and a plurality of labels having an electronic article surveillance device attached to the bottom surface.
Figure 2:
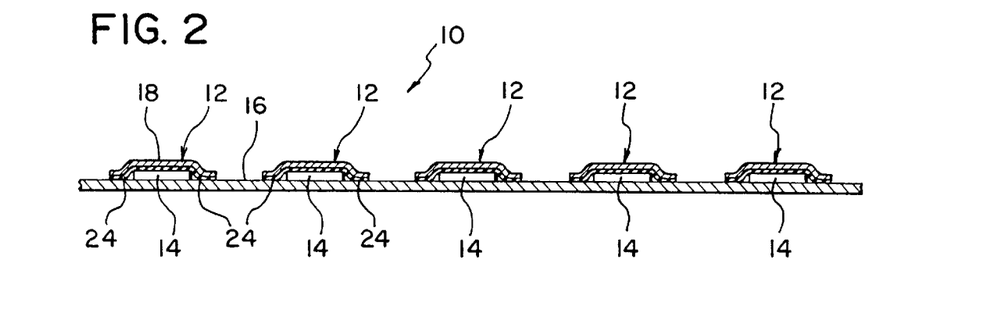
FIG. 2 is a cross-sectional side view of the label assembly of FIG. 1 taken along line 2—2 of FIG. 1.
Figure 3:
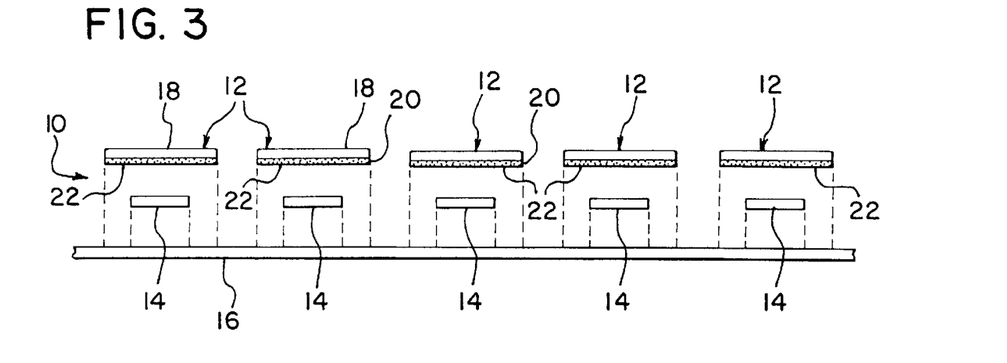
FIG. 3 is a partial exploded side elevational view of the label assembly of FIG. 1.

Referring to FIGS. 1–3, a first embodiment of the present invention is directed to a label assembly 10 having a plurality of individual labels 12 and an antitheft device in the form of an electronic article surveillance device 14 attached to or integrated with each of the labels 12. In further embodiments, an element, such as an identification or labeling device, can be attached to the labels. The labels 12 are adhesively attached to a release liner 16. The invention is further directed to a process for producing the label assembly 10 as discussed hereinafter in greater detail. As used herein, the term "label" refers to a sheet or film material which can have preprinted indicia such as, for example, a shipping label, retail label having a product name, product identification or source of manufacture. The preprinted indicia can further identify the label as having a security device to deter theft. The label can also have a blank area for inserting variable information. Alternatively, the label can be a blank sheet or a transparent film. The label assembly 10 can also be a single label having a release liner.

The electronic article surveillance device 14, hereinafter referred to as an "EAS device" is a standard surveillance tagging device as used in the industry to prevent or deter theft of merchandise or removal of items from a specific location. The EAS device can be of the magnetic foil-type, electromechanical-type or other types of surveillance devices commercially available. EAS devices are commercially available as a thin film and as a small plastic casing enclosing a resonating device. The EAS devices in preferred embodiments of the invention are the type which activate an alarm signal when the EAS device is passed through a detecting zone. Examples of suitable EAS devices are disclosed in U.S. Pat. Nos. 5,499,015 to Winkler et al, 5,493,275 to Easter and 5,495,230 to Lian which are hereby incorporated by reference in their entirety.

As shown in FIGS. 1–3, the label assembly 10 of the present invention includes label 12 with EAS device 14 adhesively attached thereto in a manner so that label 12 can be easily applied to a package, article or other substrate to cover EAS device 14. Covering the EAS device 14 with label 12 hides EAS device 14 from view. In preferred embodiments, the label 12 is adhesively attached to an article or package to cover EAS device 14 so that EAS device 14 cannot be removed from the article without first removing or destroying label 12. In this manner, label 12 provides a convenient system for tagging articles with an EAS device 14 providing a readily visible tamper evident system when the EAS device 14 is removed. In embodiments of the invention, the label assembly is positioned close to a bar code for identifying and pricing an article. Label 12 completely covers EAS device 14 to obscure EAS device 14 from plain view. As used herein, the term "article" refers to a packaged item such as a consumer item or other surface intended to accept a label.

FIGS. 1–3 illustrate label assembly 10 in a first embodiment of the invention. In this embodiment, label assembly 10 includes a plurality of labels 12 on a release liner 16. Release liner 16 is preferably coextensive with labels 12 and EAS devices 14. The labels 12 are spaced apart or butted together along the length of release liner 16 in the form of a continuous strip as known in conventional label manufacture. Label assembly 10 can be a rolled sheet, a folded sheet or a stack of cut sheets. Labels 12 can be a continuous sheet or web that can be cut to a desired length at a later stage or precut labels that are butted together.

Labels 12 include an upper surface 18 having a surface suitable for printing or writing or having a preprinted indicia. Preferably, the upper surface 18 is suitable for various printing processes including, for example, what typically is referred to as prime printing. Alternatively, labels 12 can be printed after integrating with EAS devices 14.

Labels 12 can be made from any suitable material such as plastic, paper, foils, laminates and the like as known in the art. However, it is preferable that the label material be selected to avoid interference with the EAS device or the detector device. Suitable label materials include polyethylene, ethylene vinyl acetate, polyethylene terephthalate, cellophane, cellulose nitrate, cellulose acetate, ethyl cellulose, copolymers of methyl methacrylate and paper.

Labels 12 also include a bottom surface 20 having a pressure sensitive adhesive 22. In preferred embodiments, pressure sensitive adhesive 22 covers the entire bottom surface 20 of labels 12 as a continuous coating. In further embodiments, the adhesive can be a discontinuous or localized coating. The pressure sensitive adhesives used in accordance with the present invention are generally transparent tacky adhesives commonly used in the label manufacturing field. Examples of adhesives include: acrylic types, such as those made from polyacrylic or methacrylic esters or acids, polyvinyl ethers, copolymers of vinyl ethers and acrylics, rubber based adhesives, such as those based on polyisobutylene, polychloroprene, polybutadiene, copolymers of styrene with butadiene and isoprene and latex variations on styrene, butadiene and isoprene, and adhesives based on silicone rubber such as polysiloxane methacrylate. Suitable pressure sensitive adhesives are commercially available in the market from various suppliers and manufacturers. The pressure sensitive adhesive may be of the hot melt type or the solvent type. The type of adhesive used will depend on the intended use of the label and the manufacturing process. A hot melt adhesive only requires the adhesive to cool before applying it to a surface, while solvent types require evaporation of the solvent before a subsequent process step can be carried out.

EAS devices 14 are attached to the bottom surface 20 of each label 12 as shown in FIG. 2. Preferably, EAS device 14 is adhesively bonded to label 12 by the pressure sensitive adhesive 22 on label 12. In this embodiment, EAS device 14 has a length and width less than a length and width of label 12 and is positioned substantially in the center of label 12. Preferably, EAS device 14 is positioned on bottom surface 20 of label 12 with a sufficient portion 24 of pressure sensitive adhesive 22 exposed surrounding EAS device 14 to enable the label to attach securely to a surface. In this manner, label 12 can be adhesively attached to a surface by pressure sensitive adhesive 22 to completely cover EAS device 14. In further embodiments, the bottom surface of EAS device 14 can have a coating of a pressure sensitive adhesive.

Release liner 16 can be any suitable release liner as known in the industry. Typically, release liner 16 is made of paper impregnated with a suitable release coating such as a silicone or wax containing composition.

In use, labels 12 are peeled from release liner 16 in a conventional manner along with the EAS device 14 which is adhesively attached to labels 12 by pressure sensitive adhesive 22. Labels 12 with the attached EAS device 14 are then applied to an article or other surface by the adhesive.

Figure 4:
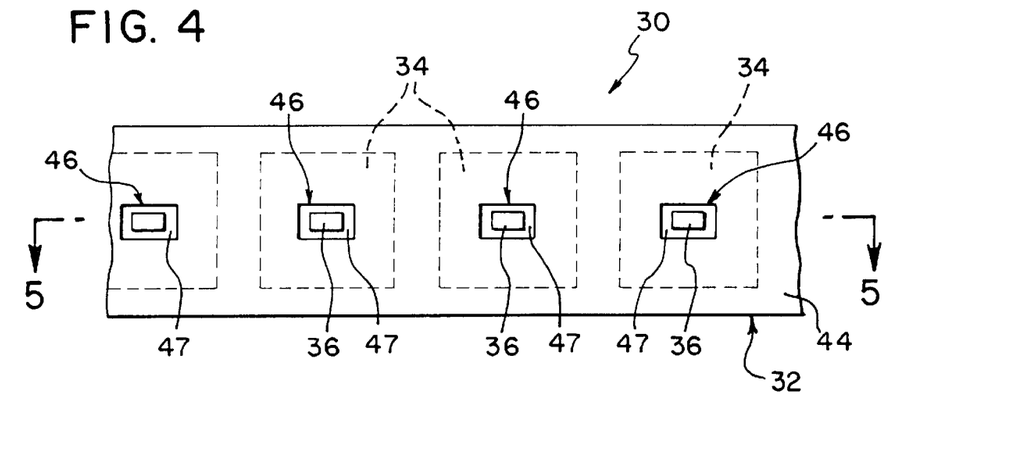
FIG. 4 is a bottom plan view of the label assembly according to a second embodiment of the invention.
Figure 5:
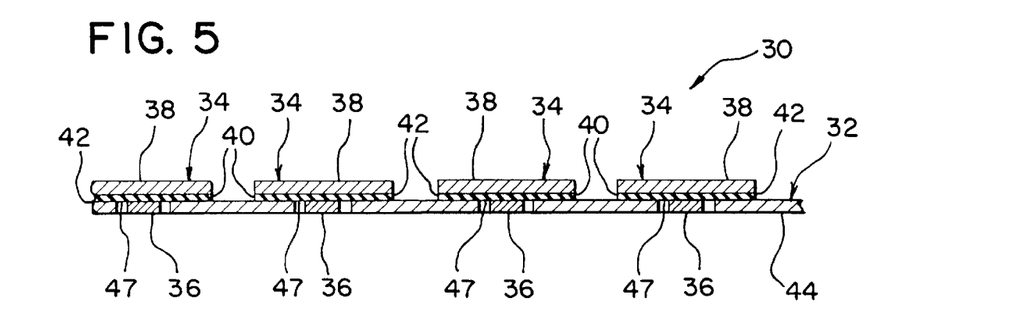
FIG. 5 is a cross-sectional side view of the label assembly of the second embodiment taken along line 5—5 of FIG. 4.
Figure 6:
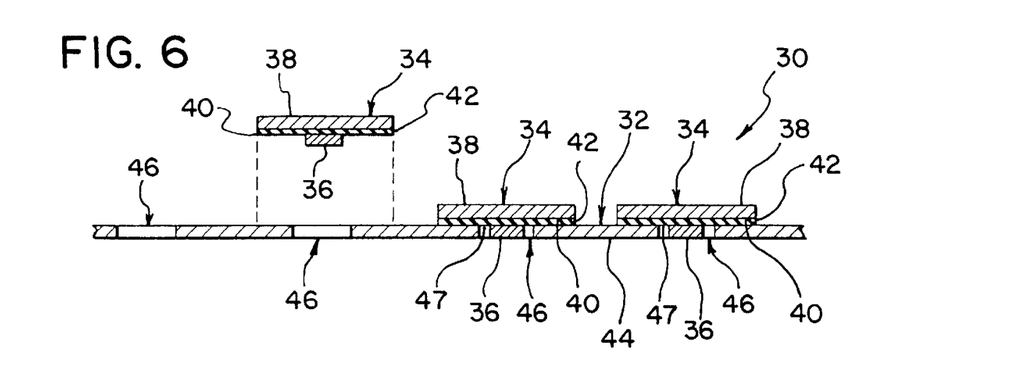
FIG. 6 is a partial exploded cross-sectional side view of the embodiment of FIG. 4.

A further embodiment of the invention illustrated in FIGS. 4–6 include a label assembly 30 having a release liner 32, and a plurality of labels 34 having an EAS device 36 attached to each of the labels 34. Labels 34 include a top surface 38 for receiving suitable indicia and a bottom surface 40 having a pressure sensitive adhesive coating 42.

As shown in FIGS. 4 and 5, release liner 32 has a bottom surface 44 and a plurality of openings or apertures 46 superimposed beneath each label 34 to expose a portion 47 of the pressure sensitive adhesive coating 42. EAS device 36 is adhesively bonded to label 34 by pressure sensitive adhesive 47 exposed in the apertures 46 of release liner 32. In the embodiment illustrated, EAS device 36 has a dimension slightly less than the dimension of apertures 46. In further embodiments, apertures 46 can have a dimension sufficiently small to minimize the exposed pressure sensitive adhesive without interfering with EAS device 36 when labels 34 are removed from release liner 32.

Referring to FIG. 6, label 34 is removed from release liner 32 so that EAS device 36 is carried with label 34. Label 34 and EAS device 36 then can be adhesively attached to a desired surface so that label 34 completely covers EAS device 36.

Label assembly 30 of the embodiment of FIGS. 4–6 can be produced by various processes. In a preferred process shown by the apparatus 48 of FIG. 7 a continuous sheet of a release liner 50 having a plurality of spaced-apart labels 52 is provided from a suitable supply 54. Supply 54 can be a roll or stack of folded sheets of previously manufactured labels 52 having a coating of a pressure sensitive adhesive 56 where labels 52 are adhesively bonded to release liner 50. Preferably, labels 52 are preprinted with the desired indicia. Labels 52 can be spaced apart as shown in FIG. 7 or a continuous web of cut labels butted together or uncut labels to be cut at a later stage.

Figure 7:
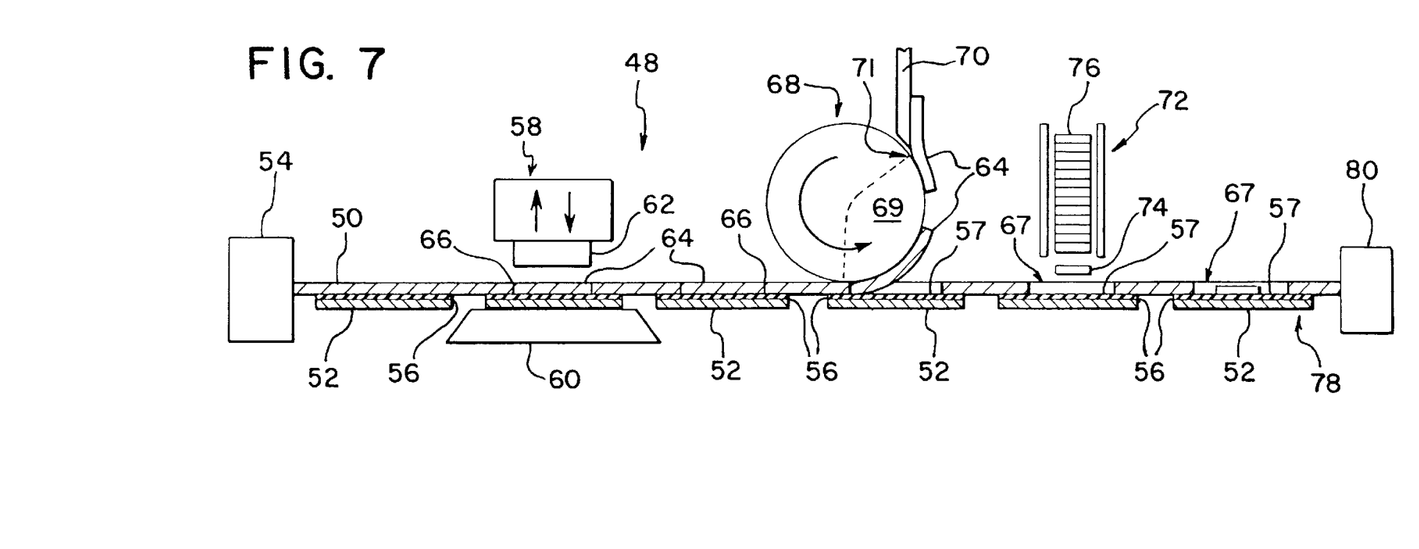
FIG. 7 is a schematic diagram of a manufacturing apparatus for producing a label assembly in accordance with a further embodiment of the invention.

In the embodiment of the apparatus 48 illustrated in FIG. 7, release liner 50 and labels 52 are passed through a die cutting assembly 58. Die cutting assembly 58 includes a platen or anvil 60 and a reciprocating die cutter 62 to cut a section 64 from release liner 50 along cut line 66 substantially without cutting labels 52. Release liner 50 and labels 52 are conveyed through die cutting assembly 58 in a step-wise fashion at increments corresponding to the position of labels 52 on the release liner 50 so that release liner 50 is cut opposite a label 52. Preferably, release liner 50 is cut in substantially the center of labels 52. In alternative embodiments, die cutting assembly 58 is a rotary cutter which cuts release liner 50 as it is continuously conveyed between a cutting wheel or cutting drum and a platen.

After cutting assembly 58 cuts section 64 from release liner 50, release liner 50 and label 52 are advanced to a vacuum roller 68 which separates cut section 64 of release liner 50 from the remainder of liner 50. Vacuum roller 68 applies a vacuum through openings in the roller surface (not shown) to section 69 of rollers 68 during rotation of roller 68 to pull cut section 64 away from release liner 50 and label 52. The vacuum is interrupted at a second point 71 of rotation of roller 68 at a peel bar 70 to strip cut section 64 of the release liner 50 from vacuum roller 68. The cut section 64 is discarded to a waste pile. Release liner 50 and label 52 exit vacuum roller 68 with a portion 57 of pressure sensitive adhesive 56 of label 52 exposed through an aperture 67 cut in release liner 50. Release liner 50 and label 52 are then advanced to a dispensing station 72 where an EAS device 74 is dispensed from a supply 76 and attached to label 52 by pressure sensitive adhesive 57 exposed in aperture 67 cut in release liner 50. An in-line testing and verification device can be provided to ensure each of the EAS devices are operational. The resulting label assembly 78 is then advanced to a storage device 80, such as a roll or stack of folded or single sheets. Apparatus 48 includes a control device, such as a microprocessor, to control the advance of the label and release liner and to control the actuation of the cutter 58, vacuum roller 68 and EAS dispenser 72.

Figure 8:
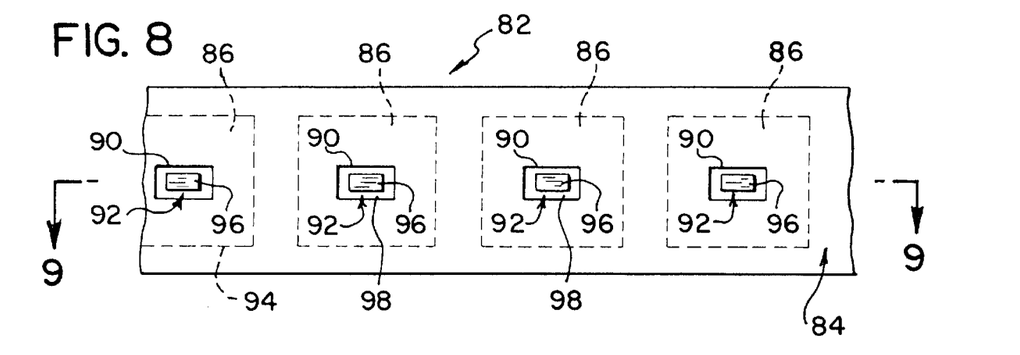
FIG. 8 is a bottom plan view of a third embodiment of the invention.
Figure 9:
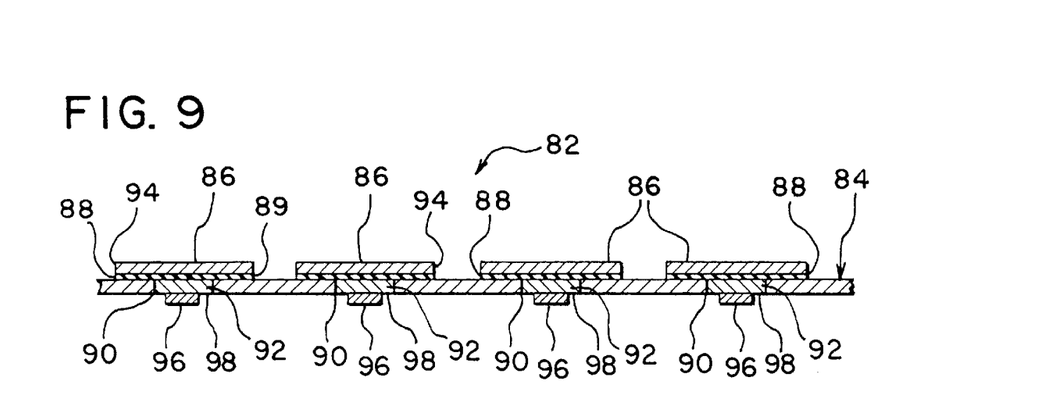
FIG. 9 is a cross-sectional view of the label assembly taken along line 9—9 of FIG. 8.
Figure 10:
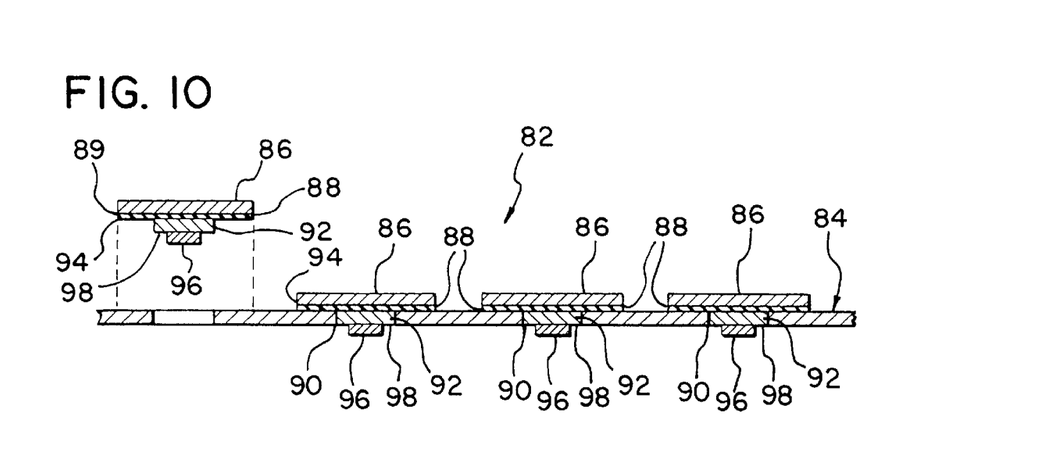
FIG. 10 is a partial exploded cross-sectional side view of the label assembly of FIG. 8.

In a further embodiment of the invention shown in FIGS. 8–10, a label assembly 82 includes a release liner 84 having a plurality a labels 86 attached thereto by a pressure sensitive adhesive 88 on a bottom surface 89 of label 86. Release liner 84 includes a plurality of cut lines 90 to form cut sections 92 in the release liner 84. As shown in FIGS. 8–10, cut lines 90 are formed opposite the labels 86 and spaced within the edges 94 of the labels 86. An EAS device 96 is attached to a bottom surface 98 of each cut section 92. As shown in FIG. 10, when label 86 is separated from release liner 84, cut section 92 and EAS device 96 attached thereto remain with label 86. Label 86 is then attached to a substrate by the pressure sensitive adhesive 88 with the label 86 covering the EAS device 96. Cut sections 92 are dimensioned substantially the same size or slightly larger than the dimensions of EAS device 96 to prevent EAS device 96 from interfering with release liner 84 during separation. In preferred embodiments, cut sections 92 are as small as possible to accommodate EAS devices 96 and to maximize the surface area of the exposed pressure sensitive adhesive 88 on the label 86. EAS devices 96 are attached to cut sections 92 by a suitable adhesive, such as for example, a hot melt glue or pressure sensitive adhesive.

Label assembly 82 can be made by various processes and apparatus. In a preferred embodiment of the manufacturing apparatus 99 depicted in FIG. 11, a preformed release liner 104 and a label 108 as an assembly 100 is fed from a supply roll 102. Release liner 104 includes a conventional release coating 106. Label 108 includes a pressure sensitive adhesive 110 on a bottom side 111 of label 108 to adhesively bond label 108 to release liner 104. Release liner 104 and label 108 are advanced to a die cutting assembly 112. In the embodiment illustrated, die cutting assembly 112 includes an anvil 114 for supporting label 108 and release liner 104 and a reciprocating cutter 116. The release liner 104 and label 108 are advanced in increments so that label 108 is stopped under cutter 116 for cutting a section 118 from release liner 104 along cut lines 120. In further embodiments, cutting assembly 112 is a rotary die cutter as known in the art.

Figure 11:
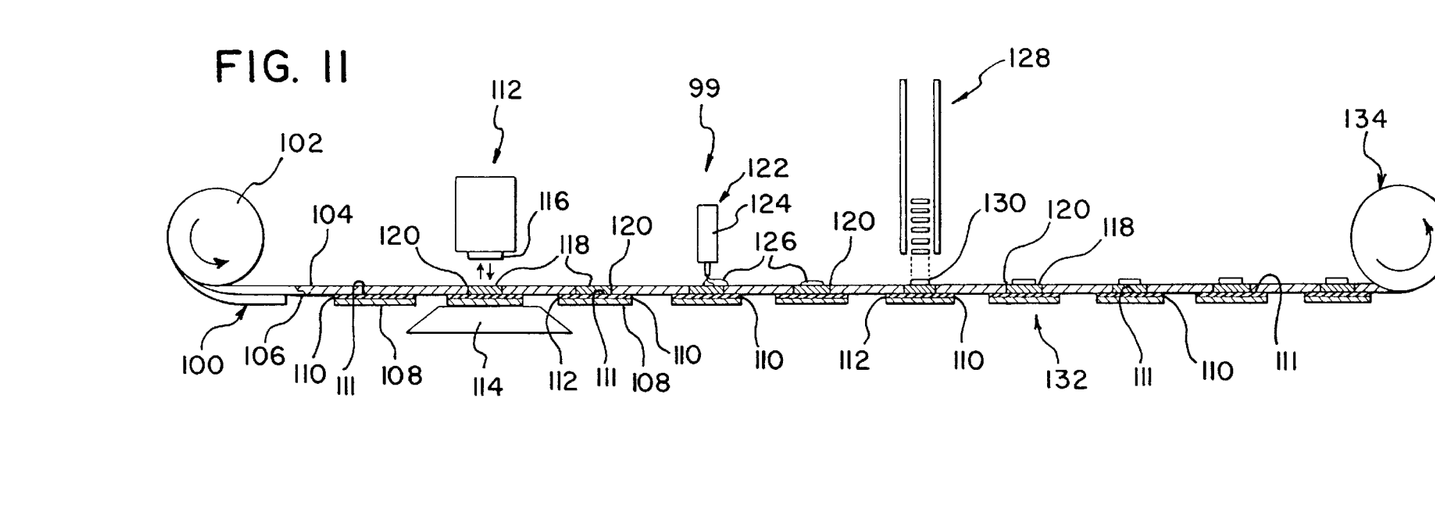
FIG. 11 is a schematic diagram of a manufacturing assembly for producing a label assembly in accordance with another embodiment of the invention.

Referring to FIG. 11, release liner 104 and label 108 are then advanced to a glue station 122 where a glue dispenser 124 dispenses a predetermined amount of glue 126 onto the advancing cut section 118 of release liner 104. The glue 126 is a conventional adhesive material such as a hot melt glue or pressure sensitive adhesive. Release liner 104 and label 108 continue to advance through an EAS dispensing device 128 where a single EAS device 130 is applied onto glue 126 for adhesively attaching EAS device 130 to cut section 118 of release liner 104. The resulting label assembly 132 is received and stored on roll 134 or other storage device. An operating and control device is included in the apparatus to control the incremental advance of the web 100 and to coordinate the actuation of the cutter 112, glue dispenser 124 and EAS dispensing device 128. In alternative embodiments, EAS device 130 is provided with a coating of a pressure sensitive adhesive to attach the EAS device 130 onto cut sections 118 thereby eliminating the need for glue dispenser 124. Alternatively, a glue dispenser can be provided to dispense an adhesive directly onto the EAS device which is then transferred to the cut sections of the release liner. In further embodiments, EAS devices 130 can be attached to release liner 104 before cutting liner 104.

Figure 12:
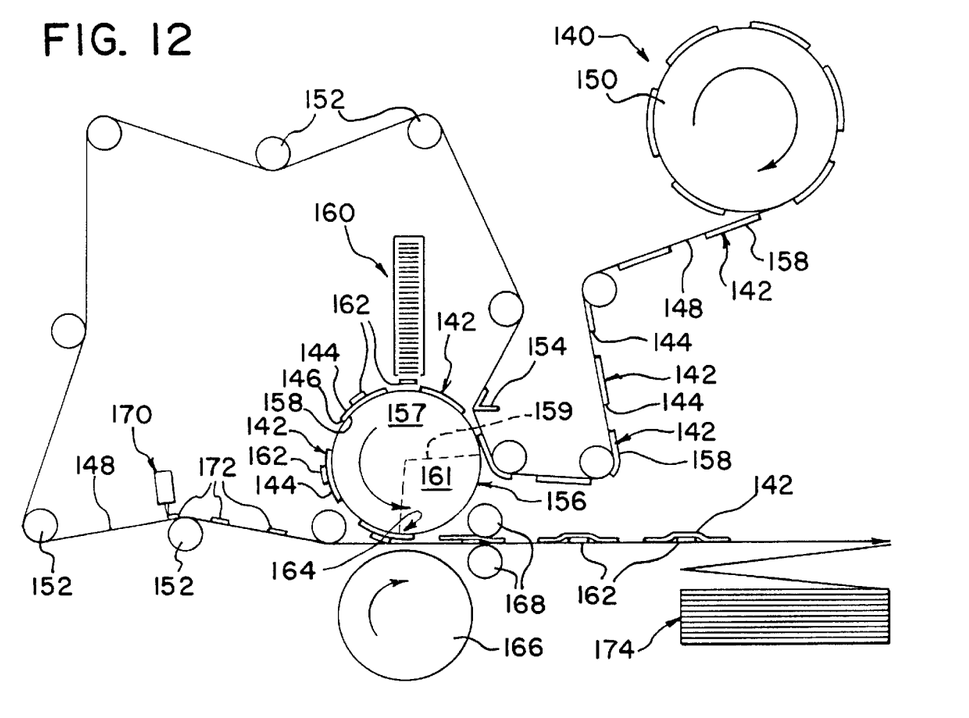
FIG. 12 is a schematic diagram of a manufacturing assembly for producing a label assembly in accordance with a further embodiment of the invention.

The label assembly 10 of the embodiment of FIGS. 1–3 also can be manufactured by various processes and apparatus. In one embodiment shown in FIG. 12, a web 140 of a preformed label 142 having a pressure sensitive adhesive 144 on a bottom surface 146 and attached to a release liner 148 is fed from a supply roll 150. Although separate labels 142 are shown, the label can be a continuous web to be cut at a cutting station. Web 140 is conveyed over a series of guide rollers 152 and over a peeler bar 154 to separate the labels 142 from the release liner 148. A rotating vacuum cylinder 156 is positioned adjacent peeler bar 154 which receives and holds the separated labels 142. Vacuum cylinder 156 includes a vacuum source and a plurality of holes (not shown) in the cylinder surface to hold the labels on the cylinder surface during rotation through section 157. Internal dividers 159 are provided in the vacuum cylinder to selectively apply the vacuum to section 157 of the cylinder and to interrupt the vacuum to section 161 of cylinder 156. As shown in FIG. 12, a top surface 158 of labels 142 are held on cylinder 156 with bottom surface 146 and pressure sensitive adhesive 144 facing outwardly from vacuum cylinder 156. Vacuum cylinder 156 rotates past an EAS dispensing device 160 which sequentially dispenses an EAS device 162 onto each label 142 as they move past dispensing device 160 to attach EAS device 162 directly to pressure sensitive adhesive 144.

The dispensing device 160 can be timed by a central control device to dispense the EAS device 162 in a desired location on labels 142. Preferably, the dispensing device 160 dispenses a single EAS device 162 substantially in the center of labels 142.

Release liner 148 is webbed around rollers 152 and back under vacuum cylinder 156. The vacuum is interrupted to vacuum cylinder 156 at an area of contact 164 of vacuum cylinder 156 on release liner 148 so that labels 142 and the attached EAS device 162 are transferred back to release liner 148 by pressure sensitive adhesive 144. The rotational speed of cylinder 156 is controlled to dispense labels 142 back onto release liner 148 at the same spaced intervals. A pressure roller 166 is positioned below vacuum cylinder 156 to apply pressure to release liner 148 and labels 142 and transfer labels 142 to release liner 148. In preferred embodiments, a second set of pressure rollers 168 are positioned immediately downstream of vacuum cylinder 156 to press pressure sensitive adhesive 144 of labels 142 firmly into contact with EAS device 162 and release liner 148. Web 140 is carried to a folded stack 174 or other storage means. The speed of rotation of vacuum cylinder 156 is equal to the speed of the web 140 so that spacing between labels 142 is substantially the same before and after EAS device insertion. Alternatively, the speed of rotation of vacuum cylinder 156 can be adjusted to increase or decrease the spacing of the labels as desired when transferred back onto the release sheet.

In embodiments of the invention, an adhesive dispenser 170 is positioned above release liner 148 before labels 142 and EAS device 162 are reapplied to the release liner 148. Adhesive dispenser 170 applies a spot of pressure sensitive adhesive 172 at the location on release liner 148 where the EAS device 162 will reattach. As EAS device 162 and label 142 are reattached to release liner 148, the spot of adhesive 172 adheres to EAS device 162 so that the surface of EAS device 162 is coated with the pressure sensitive adhesive. Labels 142 can be peeled from release liner 148 with the spot of adhesive 172 transferring to the bottom of EAS device 162 to increase the bonding strength of the label and EAS device on the substrate. In further alternative embodiments, an adhesive dispenser can be positioned next to vacuum cylinder 156 to apply an adhesive directly on the bottom of the EAS device before being attached to release liner 148.

Figure 13:
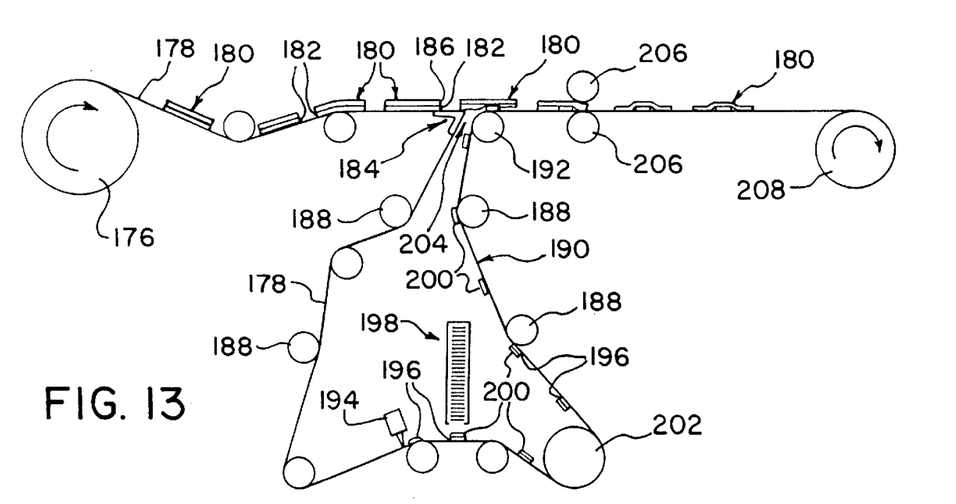
FIG. 13 is a schematic diagram of a manufacturing assembly for producing a label assembly in accordance with another embodiment of the invention.

An alternative embodiment of a manufacturing apparatus is shown in FIG. 13 for producing a label assembly substantially as shown in the embodiment of FIGS. 1–3. In the embodiment shown in FIG. 13, a supply roll 176 feeds a continuous release liner 178 having a plurality of labels 180 adhered to the release liner 178 by a coating of a pressure sensitive adhesive 182 on labels 180. Release liner 178 is conveyed around a peeler bar 184 where the leading edges 186 of labels 180 detach. Release liner 178 is conveyed around a series of rollers 188 to form a loop 190 which is then routed to a roller 192 adjacent peeler bar 184. Release liner 178 in loop 190 is conveyed beneath an adhesive dispenser 194 which is programmed to intermittently dispense an amount of an adhesive 196 onto the release coating of release liner 178. The spots of dispensed adhesive 196 are spaced apart a distance substantially equal to the repeat length of labels 180.

As shown in FIG. 13, release liner 178 then passes under a dispensing device 198 which dispenses an EAS device 200 onto the spot of adhesive 196. Dispensing device 198 is actuated at a rate corresponding to the speed of the release liner 178. Release liner 178 and EAS devices 200 pass around a roller 202 to press EAS devices 200 firmly into contact with release liner 178. Release liner 178 and attached EAS devices 200 are routed back around roller 192 spaced sufficiently close to peeler bar 184 so that leading edges 186 of the labels 180 span a narrow gap 204 and reattach to release liner 178 over EAS devices 200. The length of loop 190 is selected to accomplish the desired registration of labels 180 and EAS devices 200. Release liner 178 and EAS devices 200 are passed between pressure rollers 206 to securely attach labels 180 to release liner 178. Release liner 178 and EAS devices 200 are then conveyed to a receiving and storage roller 208. In an alternative embodiment, a bottom surface of EAS devices 200 can be provided with a coating of a pressure sensitive adhesive to eliminate the need for dispensing an adhesive onto the release sheet.

Figure 14:
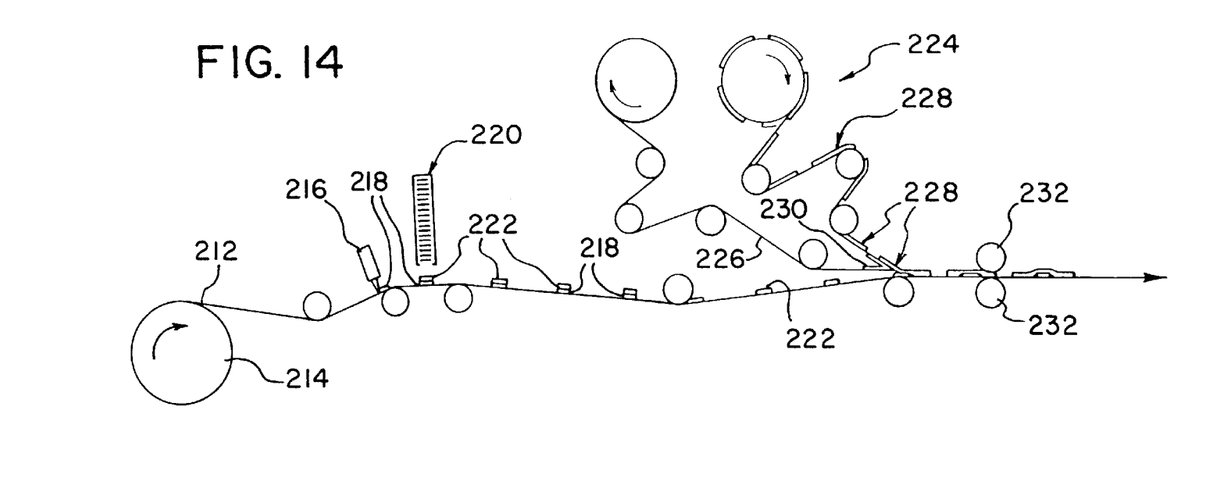
FIG. 14 is a schematic diagram of a manufacturing assembly for producing a label assembly in accordance with a further embodiment of the invention.

FIG. 14 illustrates a further process and apparatus for manufacturing a label assembly. A continuous release liner 212 is fed from a supply roll 214 to an adhesive dispenser 216 which dispenses an amount of a pressure sensitive adhesive 218 onto release liner 212 at spaced intervals. Release liner 212 is then conveyed past a dispensing device 220 which dispenses an EAS device 222 onto pressure sensitive adhesive 218.

As shown in FIG. 14, a label dispenser 224 feeds a release sheet 226 having a plurality of pressure sensitive adhesive backed labels 228 around a peeler bar 230. The labels 228 are peeled from release sheet 226 onto EAS devices 222 on release liner 212. Dispenser 224 operates at a speed corresponding to the speed of release liner 212 to deposit labels 228 onto EAS devices 222. A pair of pressure rollers 232 press the labels 228 firmly onto EAS device 222 and release liner 212.

Figure 15:
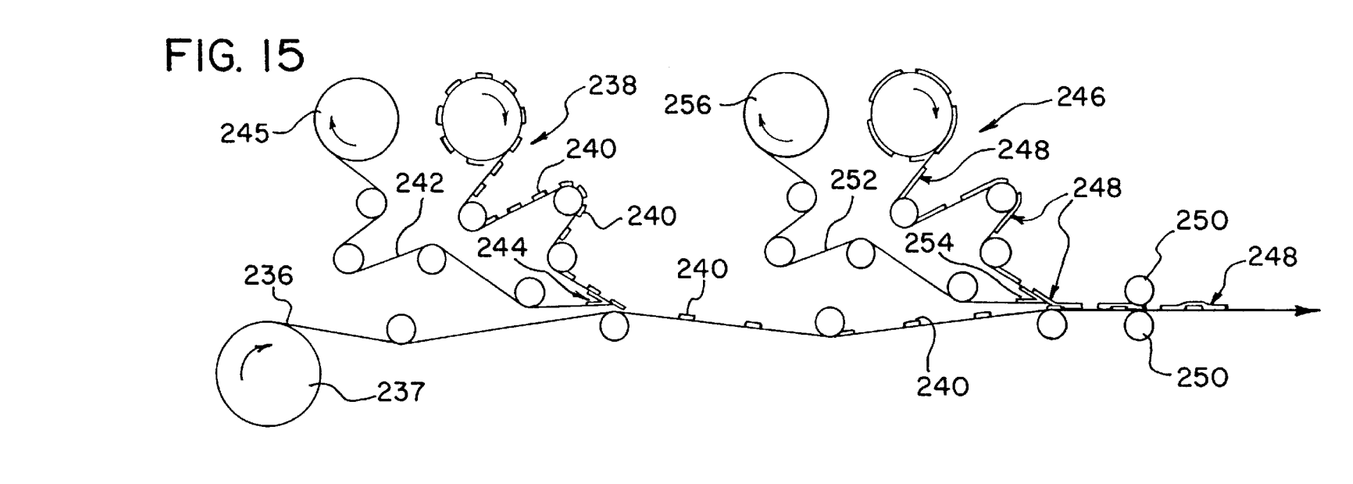
FIG. 15 is a schematic diagram of a manufacturing assembly for producing a label assembly in accordance with another embodiment of the invention.

FIG. 15 shows another embodiment of an apparatus for producing a label assembly in accordance with the invention. A release liner 236 is fed from a supply roller 237 to a first dispensing device 238 for dispensing adhesive-backed EAS devices 240 onto release liner 236. Dispensing device 238 carries a release sheet 242 having EAS devices 240 adhesively attached thereto past a peeler bar 244, Peeler bar 244 separates EAS devices 240 from release sheet 242 and deposits EAS devices 240 onto release liner 236. Release sheet 242 of dispensing device 238 is then conveyed to and stored on storage roll 245. Release liner 236 is then conveyed to label dispensing device 246 to apply labels 248 onto release liner 236 over EAS devices 240. A pair of pressure rollers 250 press the labels 248 firmly into contact with EAS devices 240 and onto release liner 236. In the embodiment illustrated in FIG. 15, label dispensing device 246 carries a release sheet 252 carrying pressure sensitive adhesive backed labels 248 over a peeler bar 254. Labels 248 are separated from release sheet 252 at peeler bar 254 and applied onto EAS devices 240 and release liner 236. Release sheet 252 of dispensing device 246 is wound on a roller 256 which can later be used as supply roller 237.

Figure 15A:
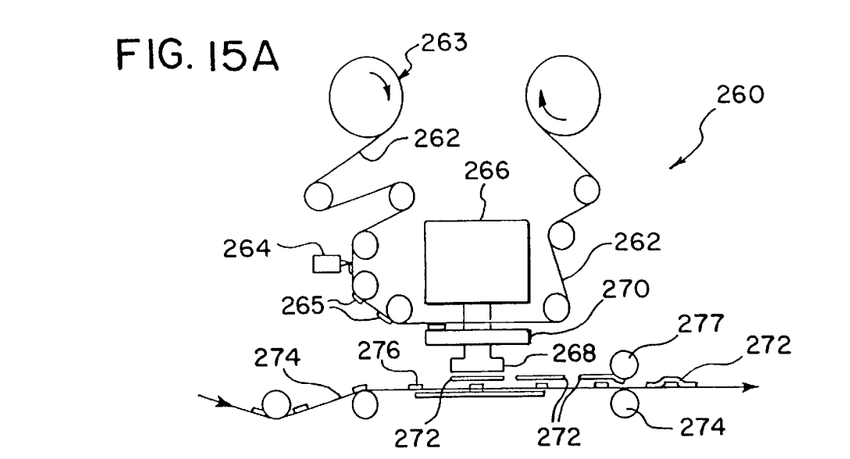
FIG. 15A is a schematic view of a labeling device for cutting a label from a sheet and applying the cut label over an electronic surveillance device.

In a further embodiment, the label dispensing device 246 can be substituted with a labeling assembly 260 shown in FIG. 15A to cut and apply labels directly onto the EAS devices. In the embodiment of FIG. 15A, labeling assembly 260 supplies a continuous printed sheet 262 of paper, plastic or the like from a supply 263 past an adhesive applicator 264 to coat pressure sheet 262 with a full coating or selected areas or spots of adhesive 265 corresponding to the size of the label to be cut. Printed sheet 262 and adhesive spots 264 travel through a die cutting unit 266. Die cutting unit 266 includes a reciprocating die cutter 268 and an anvil 270. Anvil 270 has an opening corresponding to the dimension of cutter 268. The die cutter 268 engages anvil 270 to cut or punch a label 272 from printed sheet 262 and press label 272 onto a release liner 274 and an EAS device 276 on release liner 274. The label 272, EAS device 276 and release liner 274 pass between rollers 277 to press label 272 onto EAS device 276 and release liner 274. A suitable die cutting labeling assembly is disclosed in U.S. Pat. No. 5,431,763 to Bradshaw, which is incorporated by reference in its entirety.

Figure 16:
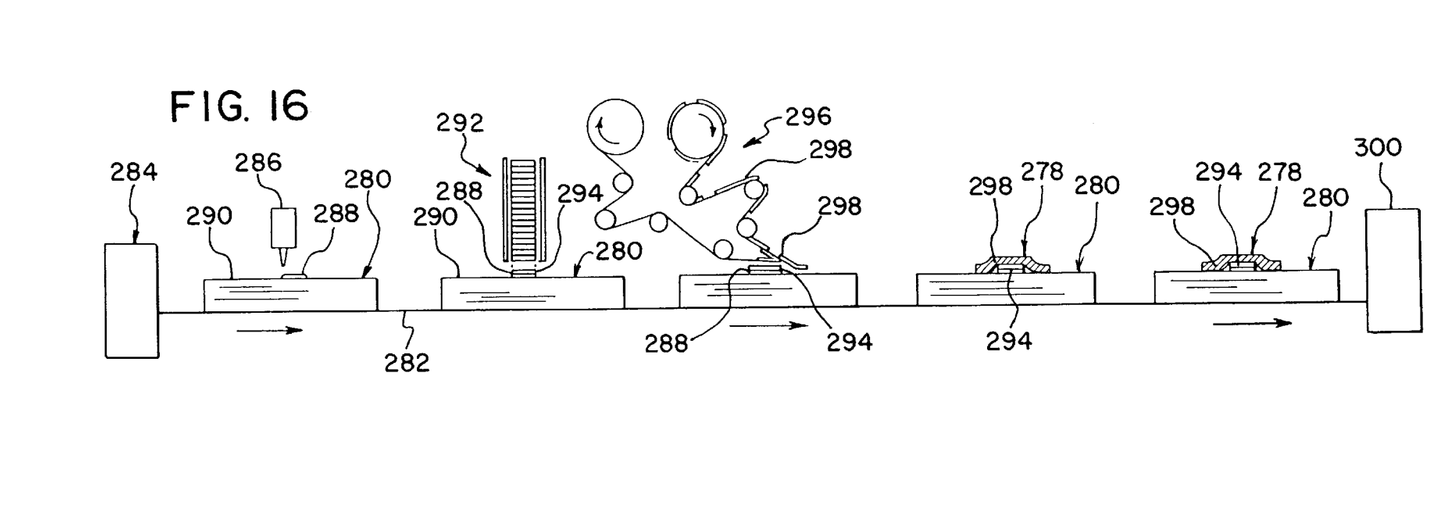
FIG. 16 is a schematic diagram of an apparatus for applying a label and an electronic article surveillance device to an article.

In the embodiment of the process and apparatus for source tagging shown in FIG. 16, a label assembly 278 is applied directly to an article such as a consumer item 280. The consumer item 280 is carried by conveyor 282 from a supply 284 past an adhesive dispenser 286 which dispenses an amount of a suitable adhesive 288 onto a top surface 290 of consumer item 280. Conveyor 282 carries consumer item 280 past dispensing device 292 which dispenses an EAS device 294 onto adhesive 288. A label dispensing device 296 applies a pressure sensitive adhesive backed label 298 over EAS device 294 directly onto consumer item 280. Label dispensing device 296 is substantially the same as in the embodiments of FIGS. 14 and 15 and will not be discussed in detail. The labeled item 280 is then conveyed to receiving station 300 for shipping.

The resulting label assemblies of the invention having an integrated EAS device can be made in folded sheets, rolls or cut sheets of any desired length and number of labels. There is no limit to the size of the label provided that the label is sufficiently large to completely cover the EAS device and have sufficient adhesive surface area to secure the label and the EAS device to the desired article.

In embodiments of the invention, the EAS devices can be integrated into a select number of labels, such as, for example, every second or third label. In this manner, only selected labels will include the EAS device so that only selected or random articles will be tagged. Alternatively, the EAS devices can be randomly integrated in the labels to reduce the overall cost of the sheet of labels. In further embodiments, only a selected number of EAS devices are active and functional as antitheft devices which are randomly dispersed among inactive EAS devices. This reduces the overall cost of the sheets of the labels to the consumer. The inactive EAS devices serve as a theft deterrent since the EAS device is presumed to be active and it is difficult to determine which EAS devices are active.

While advantageous embodiments have been chosen to illustrate the invention, it will be understood by those skilled in the art that various changes and modifications can be made therein without departing from the scope of the invention as defined in the appended claims.

What is claimed is:

1. A pressure sensitive adhesive label assembly comprising:
    a label having a top surface and a bottom surface, and a pressure sensitive adhesive coating on said bottom surface, said label having a length and a width;
    at least one antitheft device attached to said bottom surface of said label, wherein said antitheft device has a length and a width less than said length and width of said label whereby said label completely covers said antitheft device;
    a release liner removably attached to said pressure sensitive adhesive, and wherein
    said release liner has an opening surrounding said antitheft device and said antitheft device is bonded to said bottom surface of said label by said pressure sensitive adhesive.

2. The pressure sensitive adhesive label assembly of claim 1, wherein
    said antitheft device is an electronic article surveillance device.

3. The pressure sensitive adhesive label assembly of claim 2, wherein said electronic article surveillance device includes
    a top surface having a pressure sensitive adhesive coating and said top surface adhesively bonded to said release liner.

4. The pressure sensitive adhesive label assembly of claim 1, wherein said top surface of said label includes printed indicia.

5. A pressure sensitive adhesive label assembly comprising:
    a label having a top surface and a bottom surface, and a pressure sensitive adhesive coating on said bottom surface, said label having a length and a width;
    a release liner removably attached to said pressure sensitive adhesive, wherein
    said release liner is coextensive with said label, and said release liner includes a first cut portion and a second portion surrounding and separable from said first portion, and having at least one antitheft device attached to said first cut portion of said release liner.

6. The pressure sensitive adhesive label assembly of claim 5, wherein
    said antitheft device is attached to said first cut portion of said release liner by an adhesive.

7. An adhesive label assembly comprising:
    a release liner having a coating of a release layer;
    a plurality of spaced-apart labels attached to said release liner and having a bottom surface with a substantially continuous coating of a pressure sensitive adhesive; and
    a plurality of electronic article surveillance devices, each of said devices being attached to said bottom surface of a respective label, wherein each of said labels are separable from said release liner to expose a portion of said pressure sensitive adhesive on said label without separating said electronic article surveillance device from said label, and said release liner has an opening surrounding each of said electronic article surveillance devices and each of said electronic article surveillance devices being bonded to said bottom surface of a respective label by said pressure sensitive adhesive, and wherein said labels have a dimension greater than said electronic article surveillance devices to completely cover said electronic article surveillance devices.

8. The adhesive label assembly of claim 7, wherein
    said release liner is coextensive with said label and overlies said electronic article surveillance device.

9. The adhesive label assembly of claim 7, wherein a top surface of said label includes printed indicia.

10. An adhesive label assembly comprising:
    a release liner having a coating of a release layer;
    a plurality of spaced-apart labels attached to said release liner and having a bottom surface with a substantially continuous coating of a pressure sensitive adhesive, said release liner including a first cut portion overlying each of said labels and a second portion surrounding and separable from each of said first cut portions, and
    a plurality of electronic article surveillance devices, each of said devices being attached to a bottom surface of each of said first cut portions of said release liner, wherein each of each of said labels are separable from said second portion of said release liner to expose a portion of said pressure sensitive adhesive on said label without separating each of said first cut portions of said release liner and said electronic article surveillance device from said label.

11. The adhesive label assembly of claim 10, wherein
    said electronic article surveillance device is attached to said first cut portion of said release liner by an adhesive.

12. The adhesive label assembly of claim 10, wherein each of said electronic article surveillance devices include
    a top surface having a pressure sensitive adhesive coating and said top surface is adhesively bonded to each of said first cut portions of said release liner by said pressure sensitive adhesive on said top surface.

13. An article and label assembly comprising
    an article having an outer surface;
    at least one electronic article surveillance device on said outer surface of said article;
    a label having a top surface, a bottom surface, and a pressure sensitive adhesive on said bottom surface, wherein said label is adhesively bonded to said article and covers said electronic article surveillance device;
    a release liner adhesively attached to said pressure sensitive adhesive on said label, said release liner having a length and width less than a length and width of said label; and
    wherein said electronic article surveillance device is adhesively attached to said release liner.

14. The article of claim 13, wherein
    said electronic article surveillance device is adhesively attached to said article.

15. The article of claim 13, wherein
    said electronic article surveillance device is attached to said label by said pressure sensitive adhesive.

16. A process for producing a label assembly comprising the steps of
   providing a label assembly including a label having a top surface and a bottom surface, a pressure sensitive adhesive on said bottom surface, and a release liner removably bonded to said pressure sensitive adhesive;
   separating at least a portion of said release liner;
   attaching an electronic article surveillance device to said bottom surface of said label, and reattaching said label to said release liner to cover said electronic article surveillance device, wherein said electronic article surveillance device has a length and width less than a length and width of said label.

17. The process of claim 16, wherein said electronic article surveillance device has a top surface adhesively attached to said pressure sensitive adhesive and a bottom surface opposite said top surface, further comprising
   applying a pressure sensitive adhesive to said bottom surface of said electronic surveillance device prior to reattaching said release liner.

18. The process of claim 16, wherein said
   release liner is an elongated strip and said label assembly includes a plurality of said labels on said release liner strip, and said process comprises
   feeding said label assembly to a label assembling apparatus and attaching at least one electronic article surveillance device to each of said labels.

19. The process of claim 18, wherein said elongated strip is a roll.

20. The process of claim 18, wherein said elongated strip is a folded sheet.

21. The process of claim 18, further comprising
   separating said labels from said elongated strip of release liner,
   applying said at least one electronic article surveillance device between said release liner and said separated labels at spaced intervals, and
   reattaching said labels to said release liner and covering said at least one electronic surveillance device.

22. The process of claim 21, further comprising
   applying said at least one electronic article surveillance device to said release liner.

23. The process of claim 21, further comprising
   applying said at least one electronic article surveillance device to said pressure sensitive adhesive on said labels; and
   reattaching said labels with said electronic article surveillance device onto said release liner.

24. The process of claim 18, wherein at least one electronic article surveillance device is inactive.

25. A process for producing a label assembly comprising the steps of
   providing a label assembly including a label having a top surface and a bottom surface, a pressure sensitive adhesive on said bottom surface, and a release liner removably bonded to said pressure sensitive adhesive;
   cutting said release liner to form a first cut portion overlying said pressure sensitive adhesive and to form a second portion surrounding said first cut portion;
   removing said first cut portion of said release liner from said label to expose said pressure sensitive adhesive; and
   attaching an electronic article surveillance device to said exposed pressure sensitive adhesive.

26. The process of claim 25, wherein said release liner is an elongated strip and said label assembly includes a plurality of said labels on said release liner strip, said process further comprising
   cutting said release liner to form a plurality of said first portions surrounded by said second portion separable from said first portion, wherein said first cut portions are superimposed on each of said labels.

27. The process of claim 26, further comprising
   separating said first cut portions of said release liner to expose said pressure sensitive adhesive on said label; and
   attaching at least one of said electronic article surveillance devices to said exposed adhesive on each of said labels.

28. A process for producing a label assembly comprising the steps of
   providing a label assembly including a label having a top surface and a bottom surface, a pressure sensitive adhesive on said bottom surface, and a release liner removably bonded to said pressure sensitive adhesive;
   cutting said release liner to form a first cut portion overlying said pressure sensitive adhesive and a second portion surrounding said first cut portion;
   attaching an electronic article surveillance device to said first cut portion of said release liner, wherein said label is separable from said second portion of said release liner independently of said first cut portion.

29. The process of claim 28, further comprising
   a plurality of labels on said release liner and said process comprising cutting said release liner to form a first cut portion overlying each of said labels, and
   attaching at least one of said electronic article surveillance devices to said first portions of said release liner.

* * * * *

REEXAMINATION CERTIFICATE (4640th)
United States Patent
Souder et al.

(10) Number: US 5,867,102 C1
(45) Certificate Issued: Sep. 10, 2002

(54) ELECTRONIC ARTICLE SURVEILLANCE LABEL ASSEMBLY AND METHOD OF MANUFACTURE

(75) Inventors: Edward D. Souder, Downers Grove; Janusz Szczepaniec, Willow Spring; Ronald R. Garrison, Batavia, all of IL (US)

(73) Assignee: Wallace Computer Services, Inc., Hillside, IL (US)

Reexamination Request:
No. 90/005,879, Dec. 7, 2000

Reexamination Certificate for:
Patent No.: 5,867,102
Issued: Feb. 2, 1999
Appl. No.: 08/807,290
Filed: Feb. 27, 1997

(51) Int. Cl.$^7$ .............................................. G08B 13/14
(52) U.S. Cl. ...................................... 340/572.8; 283/83
(58) Field of Search ............................... 340/572.1, 551, 340/572.8; 283/83; 156/250, 230, 303

(56) References Cited

U.S. PATENT DOCUMENTS

| | | |
|---|---|---|
| 4,717,438 A | 1/1988 | Benge et al. ................ 156/152 |
| 4,900,386 A | 2/1990 | Richter-Jorgensen ....... 156/250 |
| 4,910,499 A | 3/1990 | Benge et al. ............. 340/572.3 |
| 5,284,689 A | 2/1994 | Laurash et al. ............. 428/41.6 |
| 5,614,278 A | 3/1997 | Chamberlain et al. ...... 428/41.4 |
| 5,660,663 A | 8/1997 | Chamberlain et al. ....... 156/152 |
| 6,123,796 A | 9/2000 | Kathmann et al. .......... 156/249 |

FOREIGN PATENT DOCUMENTS

EP             0 682 333 A1       11/1995

*Primary Examiner*—Thomas J. Mullen, Jr.

(57) ABSTRACT

An integrated pressure sensitive adhesive backed label assembly includes a security device such as an electronic article surveillance device, security tag or other antitheft device on a bottom side of the label so that the security device is not readily noticeable to the consumer. The label assembly can have the security device bonded to the adhesive backing of the label by separating the release liner from the label, placing the security device on the label and reapplying the release liner. Alternatively, as portions of the release liner can be cut and removed to expose a small area of the adhesive so that the security device can be attached directly to the label. The small area of the release liner can be cut and the security device attached to the cut portion so that the remaining portion of the release liner can be separated while leaving the cut portion and the security device attached to the label.

US 5,867,102 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–29 is confirmed.

New claims 30–54 are added and determined to be patentable.

30. *A process for producing a label assembly comprising the steps of*
    *providing a label assembly including a continuous release liner supporting a plurality of cut labels, said labels having a top surface and a bottom surface, and a pressure sensitive adhesive on said bottom surface, said labels being removably bonded to said release liner by said pressure sensitive adhesive;*
    *separating at least a portion of said release liner from said cut labels;*
    *attaching an electronic article surveillance device directly to said bottom surface of each of said cut labels, and reattaching said labels to said release liner to cover said electronic article surveillance device, wherein said electronic article surveillance device has a length and width less than a length and width of said label.*

31. *The process of claim 30, comprising the steps of transferring said cut labels separated from said release liner to a support device, and attaching said electronic article surveillance device on each of said cut labels while said labels are supported on said support device.*

32. *The process of claim 31, wherein said support device is a rotating drum, said process comprising the steps of:*
    *rotating said drum through a receiving station for receiving said cut labels from said release liner, advancing said drum to a dispensing station and dispensing said electronic article surveillance device onto said cut labels, and advancing said drum to a discharge station for reattaching said cut labels to said release liner.*

33. *The process of claim 30, said process comprising the steps of*
    *providing a rotating vacuum drum having an outer surface,*
    *applying a vacuum to said vacuum drum and attaching said cut labels to said outer surface of said drum with said pressure sensitive adhesive on said label facing outwardly from said drum,*
    *applying said electronic article surveillance device to said cut labels, and*
    *interrupting said vacuum and reattaching said cut labels to said release liner.*

34. *The process of claim 30, wherein said cut labels of said label assembly are spaced apart on said release liner.*

35. *A process for producing a label assembly comprising the steps of*
    *providing a label assembly including a release liner supporting a plurality of labels, said labels having a top surface, a bottom surface, and a first pressure sensitive adhesive on said bottom surface, said labels being removably bonded to said release liner by said first pressure sensitive adhesive;*
    *separating said labels from said release liner;*
    *applying a second pressure sensitive adhesive onto said release liner;*
    *attaching an electronic article surveillance device to said second pressure sensitive adhesive and reattaching said labels to said release liner to attach said electronic article surveillance device to said pressure sensitive adhesive on said bottom surface of said labels, and to cover said electronic article surveillance device, wherein said electronic article surveillance device has a length and width less than a length and width of said label.*

36. *The process of claim 35, comprising the step of attaching said electronic surveillance device to said pressure sensitive adhesive on said bottom surface of said labels and thereafter reattaching said labels to said release liner to attach said electronic surveillance device to said second pressure sensitive adhesive.*

37. *The process of claim 35, comprising the step of transferring said labels to a support surface and attaching a respective electronic surveillance device to said pressure sensitive adhesive on a respective label, and thereafter reattaching said labels to said release liner to attach said electronic surveillance device to said second pressure sensitive adhesive.*

38. *The process of claim 37, wherein said support surface is a rotating drum, said process comprising rotating said drum to a label receiving station and transferring said labels to said drum, attaching said electronic security devices to said labels while on said drum, and rotating said drum to a reattaching station to reattach said labels to said release liner.*

39. *The pressure sensitive adhesive label assembly of claim 2, wherein said electronic surveillance device is active.*

40. *The pressure sensitive label assembly of claim 2, wherein said electronic surveillance device is inactive.*

41. *The pressure sensitive adhesive label assembly of claim 5, wherein said anti-theft device is an active electronic surveillance device.*

42. *The pressure sensitive adhesive label assembly of claim 5, wherein said anti-theft device is an inactive electronic surveillance device.*

43. *The adhesive label assembly of claim 7, wherein at least one of said electronic surveillance devices is active.*

44. *The adhesive label assembly of claim 7, wherein said at least one of said electronic surveillance devices is inactive.*

45. *The adhesive label assembly of claim 10, wherein at least one of said electronic surveillance devices is inactive.*

46. *The adhesive label assembly of claim 10, wherein at least one of said electronic surveillance devices is active.*

47. *The article of claim 13, wherein said at least one electronic article surveillance device is inactive.*

48. *The article of claim 13, wherein said at least one electronic article surveillance device is active.*

49. *The process of claim 16, wherein said electronic article surveillance device is inactive.*

50. *The process of claim 16, wherein said electronic article surveillance device is active.*

51. *The process of claim 25, wherein said electronic article surveillance device is inactive.*

52. The process of claim 25, wherein said electronic article surveillance device is active.

53. The process of claim 28, wherein said electronic article surveillance device is inactive.

54. The process of claim 28, wherein said electronic article surveillance device is active.

* * * * *